(12) United States Patent
Miura et al.

(10) Patent No.: US 11,196,226 B2
(45) Date of Patent: Dec. 7, 2021

(54) OPTICAL AMPLIFYING DEVICE

(71) Applicant: MITSUBISHI ELECTRIC CORPORATION, Tokyo (JP)

(72) Inventors: Hiroshi Miura, Tokyo (JP); Naoki Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 488 days.

(21) Appl. No.: 16/094,720

(22) PCT Filed: May 13, 2016

(86) PCT No.: PCT/JP2016/064238
§ 371 (c)(1),
(2) Date: Oct. 18, 2018

(87) PCT Pub. No.: WO2017/195341
PCT Pub. Date: Nov. 16, 2017

(65) Prior Publication Data
US 2020/0235545 A1    Jul. 23, 2020

(51) Int. Cl.
*H01S 3/00* (2006.01)
*H01S 3/13* (2006.01)
(Continued)

(52) U.S. Cl.
CPC ........ *H01S 3/0078* (2013.01); *H01S 3/06754* (2013.01); *H01S 3/10015* (2013.01);
(Continued)

(58) Field of Classification Search
None
See application file for complete search history.

(56) References Cited

U.S. PATENT DOCUMENTS

| 5,859,725 A * | 1/1999 | Sugiya | ............... H04B 10/2931 |
|---|---|---|---|
| | | | 359/337.13 |
| 2003/0142388 A1* | 7/2003 | Frolov | .................... H01S 3/063 |
| | | | 359/333 |

(Continued)

FOREIGN PATENT DOCUMENTS

| JP | 6-152033 A | 5/1994 |
|---|---|---|
| JP | 2001-352119 A | 12/2001 |

(Continued)

OTHER PUBLICATIONS

International Search Report for PCT/JP2016/064238 dated August 2, 2016.
(Continued)

*Primary Examiner* — Eric L Bolda
(74) *Attorney, Agent, or Firm* — Birch, Stewart, Kolasch & Birch, LLP (57) ABSTRACT

An optical amplifying device according to the present invention includes: an optical propagation path including an optical amplifier for amplifying input light; an excitation light source for generating excitation light to excite the optical amplifier; first and second optical receivers detect the power of the input light in the optical propagation path before being amplified by the optical amplifier and the power of the light in the optical propagation path after being amplified by the optical amplifier; a third optical receiver for detecting the power of light having a traveling direction opposite to that of the input light amplified by the optical amplifier, in the optical propagation path; and a control unit for controlling the excitation light source on the basis of the light power detected by the first optical receiver, the light power detected by the second optical receiver, and the light power detected by the third optical receiver. This optical
(Continued)

amplifying device can prevent a light surge without providing dummy light and without causing a service interruption.

9 Claims, 4 Drawing Sheets

(51) Int. Cl.
    *H01S 3/067*     (2006.01)
    *H01S 3/10*     (2006.01)
    *H01S 3/16*     (2006.01)

(52) U.S. Cl.
    CPC ........ *H01S 3/13013* (2019.08); *H01S 3/1608* (2013.01); *H01S 2301/02* (2013.01)

(56) References Cited

U.S. PATENT DOCUMENTS

2003/0147126 A1*   8/2003  Rapp ................... H01S 3/06758
                                                                                                                               359/341.41
2004/0201882 A1   10/2004  Kikuchi

FOREIGN PATENT DOCUMENTS

| JP | 2003-347633 A | 12/2003 |
| JP | 2006-269855 A | 10/2006 |
| JP | 2006-324684 A | 11/2006 |

OTHER PUBLICATIONS

Extended European Search Report issued in corresponding European Application No. 16901689.6 dated Mar. 21, 2019.

* cited by examiner

OPTICAL AMPLIFYING DEVICE

TECHNICAL FIELD

The present invention relates to an optical amplifying device that amplifies light.

BACKGROUND ART

In WDM (Wavelength Division Multiplexing) communications which implement high-capacity optical network services, an optical fiber amplifier is used in order to collectively amplify all channels of light signals whose signal strengths are attenuated because of transmission. In an optical fiber amplifier, when input signal light enters a state in which an input interruption occurs due to a transmission line fault or the like, control to cause excitation light to be emitted in a maximum emission state works in order to acquire a fixed light signal gain, even though the optical fiber amplifier is in a state in which there is no input thereto. In this case, the energy by the excitation light continues to be injected into the fiber for amplification, and the inside of the amplification fiber enters a population inversion state having high energy. A problem is that, as a result, when a light signal is inputted with restoration of the system, the population inversion state of the optical fiber amplifier changes rapidly, and this causes a light surge, so that the device at the following stage becomes damaged.

In order to avoid this problem, control to shut down the excitation light is generally performed at the same time when an interruption of the input light signal is detected. In this control, when a decrease in the input light power level is detected, the occurrence of a light surge at the time of restoration of the input signal light is prevented by shutting down the excitation light.

In a conventional optical fiber amplifier that prevents a light surge by shutting down excitation light, when the excitation light shutdown is canceled after restoration of input signal light, in addition to a time required to emit excitation light again, a protection time of the order of several seconds is generally required to stabilize the output level. In this case, in a system having a configuration in which optical amplifiers are connected into a multistage cascade, a time having a serious service interruption occurs. For example, in a case of a system configuration in which N optical fiber amplifiers each having a protection time of t seconds are connected into a multistage cascade, the time required to detect the input of signal light to the optical fiber amplifier at the first stage and then output the signal light amplified by the optical fiber amplifier at the final stage, starting from the state in which the excitation light beams of all the optical fiber amplifiers are shut down, is N×t seconds. In general, because t has the order of several seconds, even though an instant signal interruption occurs, an excessive time is required to perform service restoration after the network encounters the service interruption, and a serious influence is exerted on services.

Figure 8:
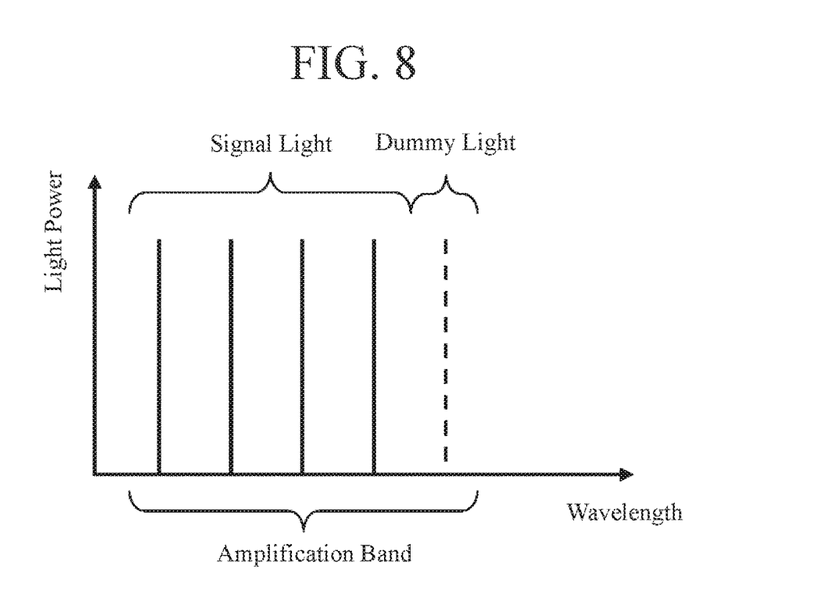
FIG. 8 is a diagram showing components in the amplification band of a conventional optical fiber amplifier.

In contrast with this, in an optical fiber amplifier described in Patent Literature 1, light (dummy light) on which no signal component is superposed is inserted into the amplification band of the optical fiber amplifier, and the power level of the dummy light is controlled in accordance with reduction in the power level of input light, as shown in FIG. 8. By thus controlling the optical amplifier in such a way that the optical amplifier is placed in a certain operating state at all times, avoidance of a shutdown is performed to avoid the occurrence of a service interruption at the same time when the occurrence of a light surge is prevented, and a light surge is prevented without causing a service interruption.

CITATION LIST

Patent Literature

Patent Literature 1: Japanese Unexamined Patent Application Publication No. Hei 6-152033

SUMMARY OF INVENTION

Technical Problem

A problem with the optical fiber amplifier described in Patent Literature 1 is that because dummy light is inserted into the amplification band of the optical fiber amplifier, not the whole amplification band can be used, and the band utilization efficiency drops. For example, in a case in which the amplification band width of the optical fiber amplifier is kb [nm], and a single dummy light wave is multiplexed, a signal band permitted for WDM signals is narrowed by a bandwidth comprising λd [nm] of the dummy light and λg [nm] of the guard band between the main signal channels and the dummy light. As a result, the bandwidth in which signal light can be inserted is λ−(λd+2λg) [nm], and the signal band permitted for WDM signals is narrowed.

The present invention is devised in order to solve the above-mentioned problem, and it is therefore an object of the present invention to implement an optical amplifying device that can use a wider amplification band than that of an optical fiber amplifier described in Patent Literature 1.

Solution to Problem

According to the present invention, there is provided an optical amplifying device including: an optical propagation path including an optical amplifier for amplifying input light; an excitation light source for generating excitation light to excite the optical amplifier; a first optical receiver for detecting the power level of the input light in the optical propagation path before being amplified by the optical amplifier; a second optical receiver for detecting the power level of the light in the optical propagation path after being amplified by the optical amplifier; a third optical receiver for detecting the power level of light having a traveling direction opposite to that of the input light, in the optical propagation path; and a control unit for controlling the excitation light source on the basis of input and output light power levels, the input light power level being a sum of power of light detected by the first optical receiver and the third optical receiver and the output power level being power of light detected by the second optical receivers.

Advantageous Effects of Invention

The optical amplifying device of the present invention can avoid a state in which the excitation light causes an optical surge upon restoration of a signal light by enabling the excitation light to emit with an appropriate power according to the target gain upon a signal light interruption.

DESCRIPTION OF EMBODIMENTS

Embodiment 1

Figure 1:
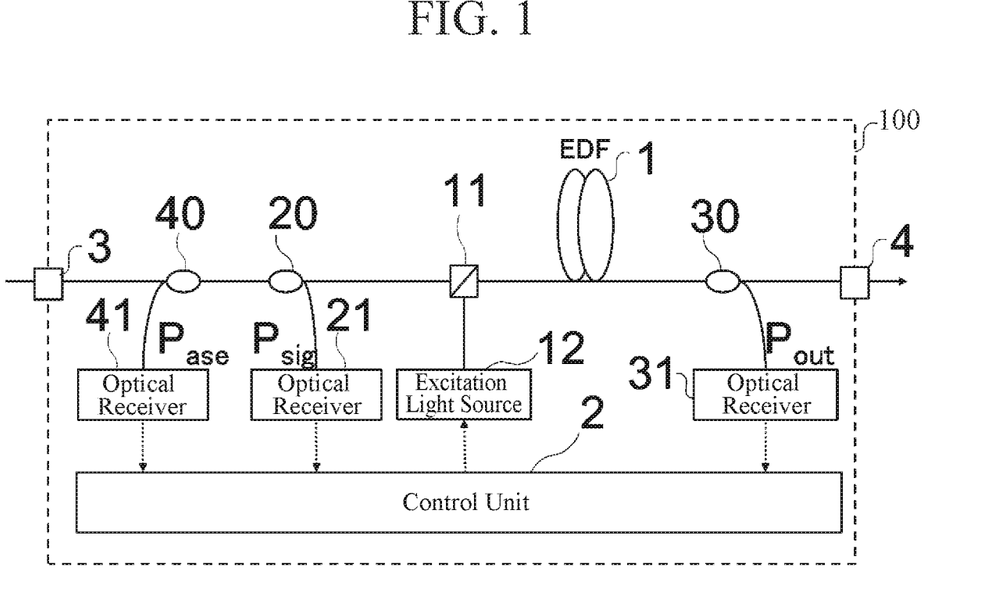
FIG. 1 is a configuration diagram showing the configuration of an optical amplifying device 100 according to Embodiment 1.

FIG. 1 is a configuration diagram showing the configuration of an optical amplifying device 100 according to the present invention. In FIG. 1, the optical amplifying device 100 includes an optical transmission line having an optical amplifier that amplifies signal light inputted thereto, multiple optical element parts comprised of a light source element and optical receiving elements, and a control unit 2 that controls the components of the optical amplifying device 100. First, each component disposed in the optical transmission line will be explained. The optical transmission line is intended for causing signal light to propagate from an optical input unit 3 toward an optical output unit 4. The optical transmission line includes an optical splitter 40 that is disposed on a side closer to the optical input unit 3 and that splits light, and an optical splitter 20 at a stage following the former optical splitter. An optical splitter 30 that splits light is included on a side closer to the optical output unit 4. Further, an EDF (Erbium doped fiber) 1 as an amplification fiber, in the optical transmission line, which is one example of the optical amplifier is disposed between the optical splitters 20 and 30, and amplifies the signal light inputted thereto. The optical transmission line further includes a wavelength selective optical combiner 11, as a first irradiating unit, between the optical splitter 20 and the EDF 1.

Signal light is inputted to the optical input unit 3. Although this input signal light is one in which multiple signal light beams having mutually different wavelengths are multiplexed, alternatively, the input signal light can be one having a single wavelength. The optical output unit 4 outputs the signal light amplified by the EDF 1 as output signal light. Both of the optical splitters 20 and 30 split the signal light travelling toward a forward direction from the optical input unit 3 to the optical output unit 4 to extract a part of the signal light. The wavelength selective optical combiner 11 combines only light beams in a specific wavelength band, and inputs combined signal light to the EDF 1.

Next, the configuration of the light source element and the optical receiving elements which are shown in FIG. 1 will be explained. An excitation light source 12 includes a laser diode (LD), and it doesn't matter whether the power is fixed or variable. The excitation light source 12 is connected to the optical transmission line via the wavelength selective optical combiner 11, and the wavelength selective combiner 11 has a role in combining light generated by the excitation light source 12 with the signal light, and performing injection into the EDF 1. The excitation light source 12 amplifies the inputted signal light by applying light having a specific wavelength to the EDF 1 via the wavelength selective combiner 11. As the excitation light for the EDF, light having a wavelength of 980 nm or 1480 nm is used generally. Further, as an impurity-doped optical fiber having a role of an amplification fiber, an optical fiber into which another rare earth element such as thulium is doped instead of erbium can be used. Each of optical receivers 21, 31, and 41 includes an optical receiving element. As an optical receiving element, for example, a photo diode (PD) is provided. The optical receiver 21 detects the power level Psig of the input signal light, the optical receiver 31 detects the power level Pout of the output signal light, and the optical receiver 41 detects the power level Pase of backward amplified spontaneous emission (ASE) noise. All of the optical receiving elements that constitute these optical receivers 21, 31, and 41 have a function of converting light signal into an electric signal, and convert current values acquired thereby, the current values corresponding to the light power levels, into voltage values. Psig, Pout, and Pase mentioned above are shown by the voltage values put into one-to-one correspondence with the light power levels.

Figure 2:
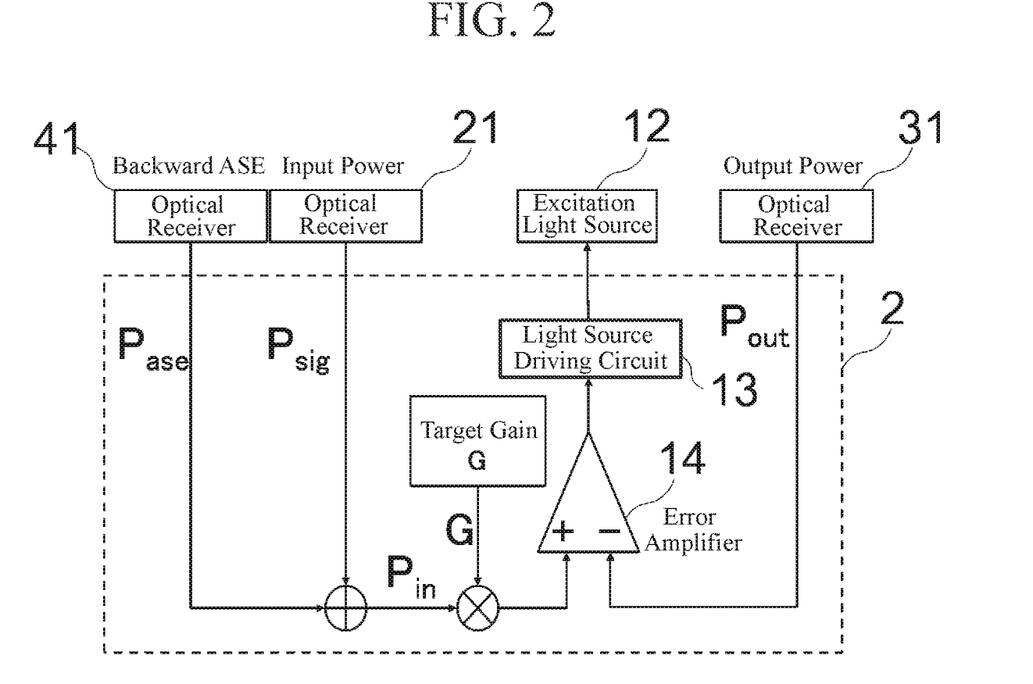
FIG. 2 is a logical configuration diagram of a control unit 2 according to Embodiment 1.

Next, the control unit 2 that controls the components of the optical amplifying device 100 will be explained. A logical configuration diagram of the control unit 2 is shown in FIG. 2. The control unit 2 adds the voltage value of Psig detected by the optical receiver 21 and the voltage value of Pase detected by the optical receiver 41 by using an adder. The result is multiplied by a voltage value showing a target gain G externally set up, by using a multiplier, and the result is inputted to a positive feedback terminal of an error amplifier 14. Further, the voltage value of Pout detected by the optical receiver 31 is inputted to a negative feedback terminal of the error amplifier 14. Here, the error amplifier generally includes an operational amplifier, and is a device that outputs a voltage corresponding to the difference between the voltages applied to the two input terminals thereof. The voltage signal outputted from the error amplifier 14 is inputted to a light source driving circuit 13. The light source driving circuit 13 generates a current or voltage being able to drive the LD of the excitation light source 12 in accordance with the output of the error amplifier 14. Additionally, the control unit 2 can include whichever of an analog circuit and a digital circuit.

In the control unit 2, the excitation light source driving circuit 13 is controlled in such a way that the ratio Pout/Pin of the output power level, Pout, inputted to the error amplifier 14 and the input power level, Pin, matches the target gain G.

Next, the operation of the optical amplifying device 100 will be explained on the basis of the configurations of FIGS. 1 and 2.

<1> At the time of a normal operation, when the power level of the input light is expressed by Psig, the target gain is expressed by G, and the power level of ASE by the optical amplifier is expressed by Pase, the power level, Pout, of the output light of the optical amplifier is expressed by an equation (1). Further, it is seen from FIG. 2 that the input light power level, Pin, detected by the error amplifier is expressed by the sum of the input signal light power level Psig and Pase (equation (2)). Pase in the equation (2) is the power level of the backward ASE which is sent out by the amplification fiber 1 in a direction opposite to that of the signal, and generally has a value nearly equal to the power level of forward ASE. Here, Pase is much lower than Psig.

In addition, $n_{sp}$ denotes the spontaneous emission light coefficient of the optical amplifier, h denotes the Planck constant, ν denotes the light frequency, and Δf denotes the noise bandwidth.

$$P_{out}=GP_{in}=G(P_{sig}+P_{ase})=G(P_{sig}+2h\nu(G-1)n_{sp}\Delta f) \quad (1)$$

$$P_{in}=P_{sig}+P_{ase} \quad (2)$$

<2> At the time of an input signal interruption (Psig=0), amplified ASE satisfying Pout=GPase is outputted from the amplifier. In general, while ASE is outputted bidirectionally from both ends of an amplification fiber, ASE travelling in a direction opposite to that of a signal is blocked by an optical isolator placed in the optical amplifier, which is used for prevention of laser oscillation. Here, when the operation gain of the signal except the ASE is expressed by G', the operation gain is expressed by an equation (3).

$$G = \frac{P_{out}}{P_{sig}} = G' + G'\frac{P_{ase}}{P_{sig}} = G' + \Delta G \quad (3)$$

From the equation (3), ΔG is an error from the target gain of the operation gain. In the present invention, as shown in FIG. 2, also at the time of an input signal light interruption, by providing a gain calculating unit with Pase, which is the backward ASE, as an offset, optimal excitation light power corresponding to the desired gain can be injected into the amplification fiber at all times. In the Background of the Invention, at the time of an input signal light interruption, in order to maintain a fixed gain between the input light power level and the output light power level, the excitation light enters a maximum emission state, a population inversion state having high energy is formed in the amplification fiber, and the energy is released all at once at the time of signal light restoration, so that a light surge occurs. In contrast with this, in the present invention, even at the time of a signal light interruption, the excitation light is emitted with optimal power corresponding to the target gain because an offset is added to the input light power level. It is seen from these descriptions that there does not occur a maximum emission state in which the excitation light causes a light surge at the time of signal light restoration. Further, while in the optical fiber amplifier described in Patent Literature 1, it is necessary to provide dummy light, in this embodiment, because the control unit 2 performs control on the basis of the light power detected by the optical receivers 21, 31, and 41 in such a way that Pout/Pin matches the target gain G, it is not necessary to provide dummy light.

Figure 3:
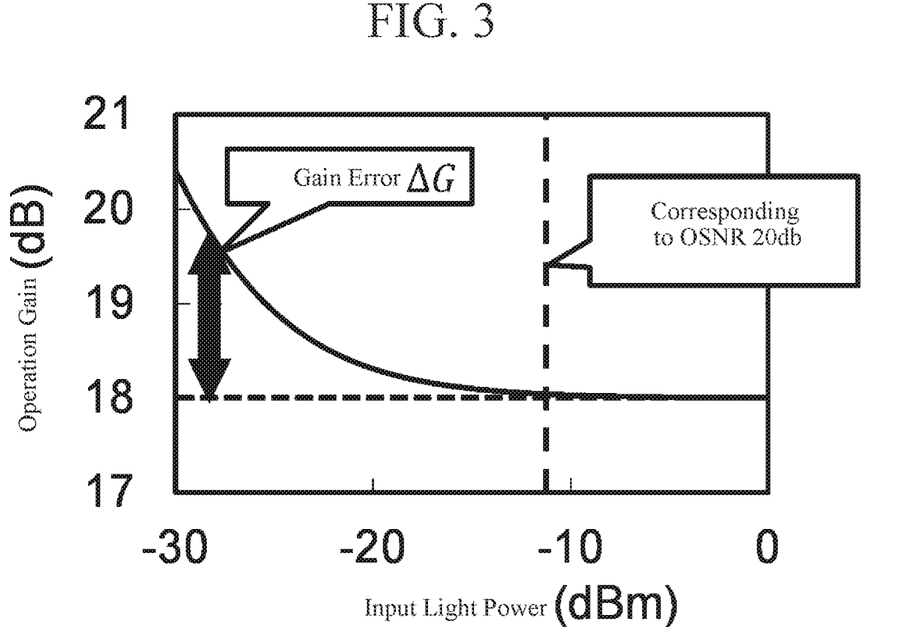
FIG. 3 is a diagram showing results of calculation of an operation gain for input power in Embodiment 1.
Figure 4:
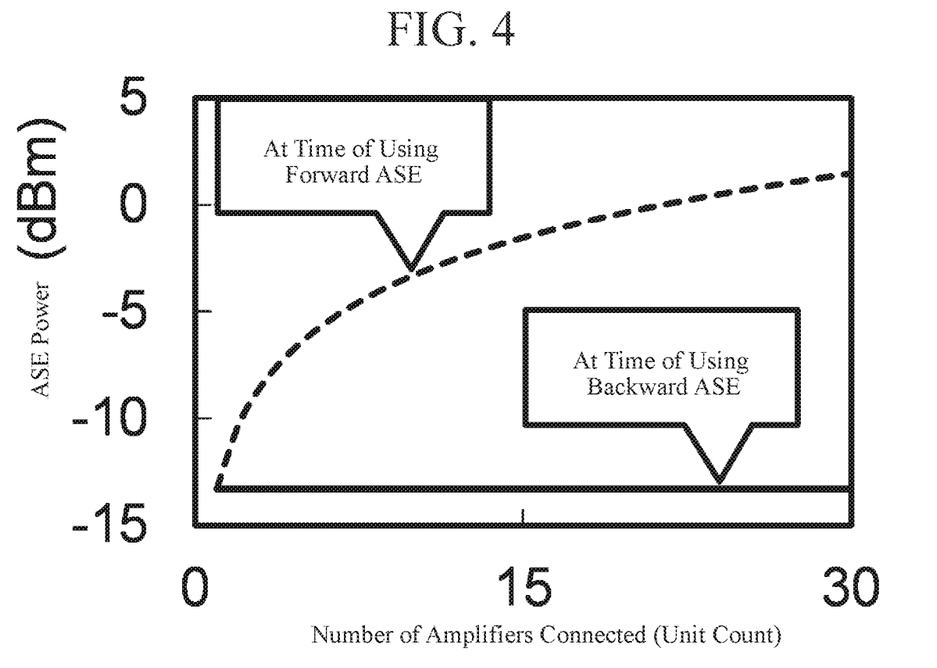
FIG. 4 is a diagram showing results of calculation of ASE power against the number of amplifiers connected in Embodiment 1.

However, because ASE is used as part of input light power, a gain error γG occurs notably when the input light power is low. Results of calculation of the operation gain against the input light power in a case in which the target gain is 18 dB are shown in FIG. 3. A case in which the gain error γG by ASE is equal to or less than 0.1 dB is one in which the input light power is equal to or greater than −15 dB. For example, a result of calculation of γG is 0.04 dB in a case in which the input light corresponds to an optical signal to noise ratio (OSNR) of 20 dB at input to this optical fiber amplifier. This is a permissible error for practical use. Further, in a case in which the backward ASE according to this embodiment is not used and the forward ASE is used as ASE by assuming that optical fiber amplifiers are connected into a multistage cascade, an optical fiber amplifier located further downstream has larger γG because accumulated ASE power is recognized as ASE power (FIG. 4). In contrast with this, because the backward ASE is used in the present invention, the power level of the ASE outputted from the optical amplifier at the time of an input signal interruption (Psig=0) is fixed to (G+1)Pase regardless of the number of optical fiber amplifiers connected.

As mentioned above, in the present invention, by using the backward ASE, a fixed-gain type optical amplifier that does not have to have a dummy light source and perform excitation light shutdown control for light surge prevention is implemented.

As explained above, the optical amplifying device 100 according to Embodiment 1 includes: the optical propagation path including the optical amplifier that amplifies input light; the excitation light source 12 that generates excitation light to excite the optical amplifier; the optical receiver 21 (referred to as a first optical receiver) that detects the power level of the input light in the optical propagation path before being amplified by the optical amplifier; the optical receiver 31 (referred to as a second optical receiver) that detects the power level of the light in the optical propagation path after being amplified by the optical amplifier; the optical receiver 41 (referred to as a third optical receiver) that detects the power level of light having a traveling direction opposite to that of the input light, in the optical propagation path; and the control unit 2 that controls the excitation light source 12 on the basis of the light power levels detected by the first, second, and third optical receivers. With this configuration, a light surge can be prevented without providing dummy light and without causing a service interruption. As a result, a wider amplification bandwidth than that of the optical fiber amplifier described in Patent Literature 1 can be used.

Further, in the optical amplifying device 100 according to Embodiment 1, the input light is signal light. With this configuration, this optical amplifying device 100 can be applied to optical communications.

Further, in the optical amplifying device 100 according to Embodiment 1, the signal light is the one in which multiple signal light beams having different wavelengths are multiplexed. With this configuration, this optical amplifying device 100 can be applied to optical communications in which signals are multiplexed using different wavelengths.

Further, in the optical amplifying device 100 according to Embodiment 1, the control unit 2 controls the excitation light source 12 in such a way that the light power level, Pout, detected by the second optical receiver approaches power (GPin+Pase) which is set on the basis of both the light power levels detected by the first and third optical receivers. With this configuration, it becomes possible to control the amplification gain of the optical amplifier in such a way that the amplification gain approaches the target gain.

Further, in the optical amplifying device 100 according to Embodiment 1, when there exists no input light, the control unit 2 controls the excitation light source 12 in such a way that the light power level, Pout, detected by the second optical receiver approaches the light power level, Pase, detected by the third optical receiver. With this configuration, also in a case in which optical amplifiers are connected into a multistage cascade, the ASE power in the case in which there exists no input light can be maintained constant regardless of the number of optical fiber amplifiers connected.

Further, in the optical amplifying device 100 according to Embodiment 1, the optical propagation path has the wavelength selective combiner 11 that is disposed in a propagation path through which the input light before being amplified by the optical amplifier propagates, and that combines the excitation light generated by the excitation light source 12 with the input light before being amplified. With this configuration, the optical amplifier can be excited by the excitation light from a stage preceding the optical amplifier.

Embodiment 2

In Embodiment 2, the configuration of an optical amplifier in a case in which the arrangement of optical combining/splitting units 20 and 40 is changed with respect to Embodiment 1 will be explained.

Figure 5:
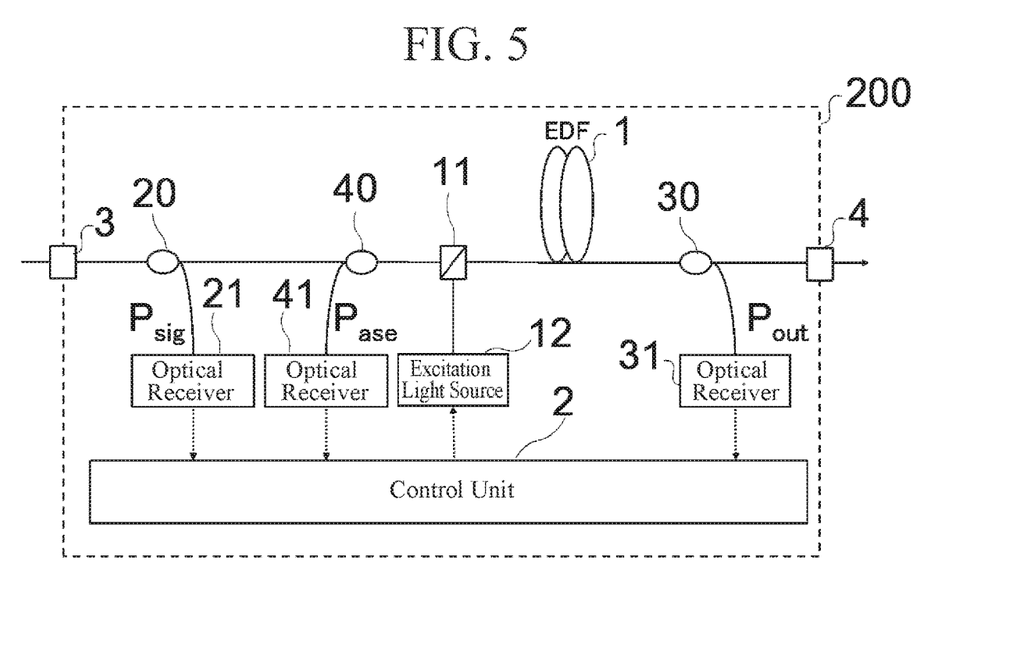
FIG. 5 is a configuration diagram showing the configuration of an optical amplifying device 200 according to Embodiment 2.

FIG. 5 is a configuration diagram showing the configuration of an optical amplifying device 200 according to Embodiment 2. The same components as those of Embodiment 1 or corresponding components are denoted by the same reference numerals, and an explanation of the components will be omitted hereafter. Although in Embodiment 1, Pase is detected at a stage preceding that of detecting Psig, the positions of detection of Pase and Psig can be interchanged, as shown in FIG. 5. More specifically, the optical combining/splitting units 20 and 40 are arranged in this order from a side of an optical input unit 3 with respect to an optical transmission line. FIG. 5 is a configuration diagram showing an embodiment in such a case. By using this configuration, because the power level Psig of input signal light, the power level being detected by an optical receiver 41, is not affected by an insertion loss by the optical combining/splitting unit 40, an accurate gain can be calculated.

Embodiment 3

While in Embodiments 1 and 2, the wavelength selective optical combiner 11 and the excitation light source 12 are disposed at stages preceding the EDF 1, in Embodiment 3, a configuration in which a wavelength selective optical combiner 11 and an excitation light source 12 are disposed at stages following a EDF 1 will be explained.

Figure 6:
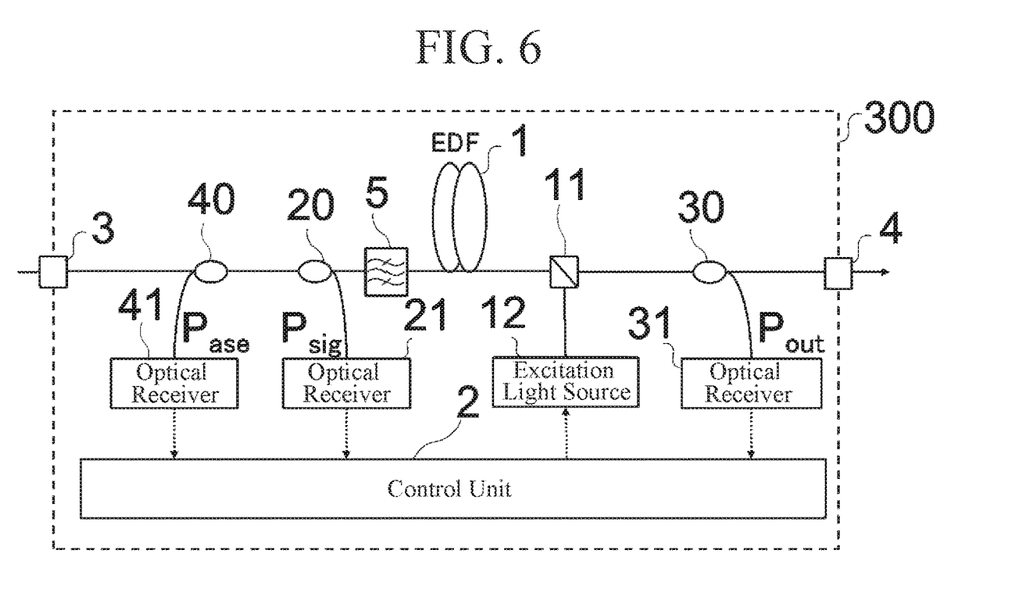
FIG. 6 is a configuration diagram showing the configuration of an optical amplifying device 300 according to Embodiment 3.

FIG. 6 is a configuration diagram showing the configuration of an optical amplifying device 300 according to Embodiment 3. The same components as those in FIG. 1 or corresponding components are denoted by the same reference numerals, and an explanation of the components will be omitted hereafter. While in the optical amplifying device 100 according to Embodiment 1, the wavelength selective optical combiner 11 and the excitation light source 12 are disposed at stages preceding the EDF 1, the optical amplifying device 300 according to Embodiment 3 differs in that the wavelength selective optical combiner 11 as a second optical combiner and the excitation light source 12 are disposed at stages following the EDF 1, and a wavelength selective transmitter 5 is inserted between an optical combining/splitting unit 20 and the EDF 1. In this case, at a stage following the EDF 1, the excitation light source 12 excites the EDF 1. Further, the wavelength selective transmitter 5 has a role in removing excitation light travelling in the same direction as backward ASE, and allowing only backward ASE in a signal band to pass therethrough. Although in FIG. 6, the wavelength selective transmitter 5 is placed between the optical combining/splitting unit 20 and the EDF 1, taking its role into consideration, it is sufficient just to insert the wavelength selective transmitter between an optical receiver 41 that detects Pase and the EDF 1. In addition, it is needless to say that the sequence of the optical receivers 41 and the accompanying sequence of the optical combining/splitting units 20 and 40 can be changed, like in the case of Embodiment 2.

In Embodiment 3, with the configuration of backward excitation which causes the excitation light to be combined from a stage following the EDF 1, it becomes difficult for gain saturation of signal light to occur, though noise degradation is great compared with that in the configuration of forward excitation. More specifically, higher power than that in the forward excitation which performs excitation from a stage preceding the EDF 1 by using the excitation light source 12 can be acquired.

More specifically, in the optical amplifying device 300 according to Embodiment 3, the wavelength selective optical combiner 11 that combines the excitation light generated by the excitation light source 12 with the input light after being amplified is provided in a propagation path through which the input light after being amplified by the optical amplifier propagates. With this configuration, higher power than that in the forward excitation which performs excitation from a stage preceding the EDF 1 by using the excitation light source 12 can be acquired.

Further, in the optical amplifying device 300 according to Embodiment 3, an optical propagation path has the wavelength selective transmitter 5 which is an optical transmitter having wavelength selectivity, between the position of detection of light where power is detected by a third optical receiver (the position of the optical splitter 40) and the optical amplifier. With this configuration, the excitation light travelling in the same direction as the backward ASE can be removed, and only the backward ASE in the signal band can be allowed to pass.

Embodiment 4

In this embodiment, the configuration of an optical amplifier in which an excitation light source 52 as an excitation light source disposed at a stage following a EDF 1 and a wavelength selective optical combiner 51 are further included will be shown.

Figure 7:
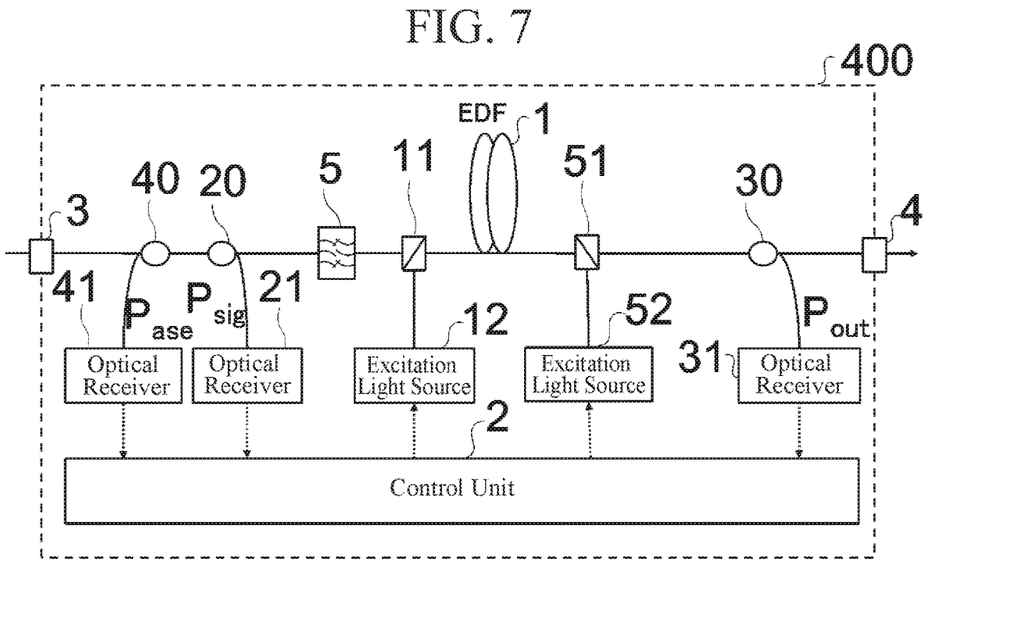
FIG. 7 is a configuration diagram showing the configuration of an optical amplifying device 400 according to Embodiment 4.

FIG. 7 is a configuration diagram showing the configuration of an optical amplifying device 400 according to Embodiment 4. The same components as those in FIG. 1 or corresponding components are denoted by the same reference numerals, and an explanation of the components will be omitted hereafter. The configuration is the one in which in addition to the configuration of the optical amplifying device 100 according to Embodiment 1, the excitation light source 52 as an excitation light source disposed at a stage following the EDF 1, and the wavelength selective optical combiner 51 are further included. The EDF 1 is excited from both a preceding stage and the following stage. Therefore, it is possible to perform uniform excitation throughout the full length of the EDF 1. Although in FIG. 7, a wavelength selective transmitter 5 is placed between an optical combining/splitting unit 20 and a wavelength selective optical combiner 11, taking its role into consideration, it is sufficient just to insert the wavelength selective transmitter between an optical receiver 41 that detects Pase and the wavelength selective optical combiner 11. In addition, it is needless to say that the sequence of optical receivers 21 and 41 and the accompanying sequence of the optical combining/splitting units 20 and 40 can be changed, like in the case of Embodiment 2.

In Embodiment 4, the optical amplifying device 400 in which the wavelength selective optical combiner 51 and the excitation light source 52 are further included at stages following the EDF 1 is shown. With this configuration, it is possible to perform uniform excitation throughout the full length of the EDF 1, and input light can be amplified efficiently.

Further, in the optical amplifying device 400 according to Embodiment 4, an optical propagation path has the wavelength selective transmitter 5 which is an optical transmitter having wavelength selectivity, between the position of detection of light where a power level is detected by a third optical receiver (the position of the optical splitter 40) and the wavelength selective optical combiner 11. With this configuration, excitation light travelling in the same direction as backward ASE can be removed, and only backward ASE in a signal band can be allowed to pass.

REFERENCE SIGNS LIST

1: EDF, 2: control unit, 3: optical input unit, 4: optical output unit, 11, 51: wavelength selective combiner, 12, 52: excitation light source, 13: light source driving circuit, 14: error amplifier, 20, 30, 40: optical splitter, 21, 31, 41: optical receiver, and 100: optical amplifying device.

The invention claimed is:

1. An optical amplifying device comprising:
   an optical propagation path including an optical amplifier to amplify input light;
   an excitation light source to generate excitation light to excite the optical amplifier;
   a first optical receiver to detect power of the input light in the optical propagation path before being amplified by the optical amplifier;
   a second optical receiver to detect power of the light in the optical propagation path after being amplified by the optical amplifier;
   a third optical receiver to detect power of light having a traveling direction opposite to that of the input light in the optical propagation path; and
   a controller to control the excitation light source on a basis of input and output light power levels, the input light power level being a sum of power of light detected by the first optical receiver and the third optical receiver and the output power level being power of light detected by the second optical receiver.

2. The optical amplifying device according to claim 1, wherein the input light is signal light.

3. The optical amplifying device according to claim 1, wherein the input light is signal light in which multiple signal light beams having different wavelengths are multiplexed.

4. The optical amplifying device according to claim 1, wherein the controller controls the excitation light source in such a way that the light power detected by the second optical receiver approaches power which is set on a basis of both the light power detected by the first optical receiver and the light power detected by the third optical receiver.

5. The optical amplifying device according to claim 1, wherein when the input light does not exist, the controller controls the excitation light source in such a way that the light power detected by the second optical receiver approaches the light power detected by the third optical receiver.

6. The optical amplifying device according to claim 1, wherein the optical propagation path has a combiner to combine the excitation light and the input light in a propagation path through which the input light before being amplified by the optical amplifier propagates.

7. The optical amplifying device according to claim 1, wherein the optical propagation path has a combiner to combine the excitation light and the input light after being amplified by the amplifier in a propagation path through which the input light after being amplified by the optical amplifier propagates.

8. The optical amplifying device according to claim 1, wherein the optical propagation path has a wavelength selective filter between a position where the power of the light is detected by the third optical receiver, and the optical amplifier.

9. The optical amplifying device according to claim 6, wherein the optical propagation path has a wavelength selective filter between a position where the power of the light is detected by the third optical receiver, and the combiner.

* * * * *